(12) United States Patent
Heideman (10) Patent No.: US 10,571,261 B1
(45) Date of Patent: Feb. 25, 2020

(54) LATERAL SHEARING INTERFEROMETER FOR AUTO ALIGNMENT BEAM SENSING

(71) Applicant: RAYTHEON COMPANY, Waltham, MA (US)

(72) Inventor: Kyle Heideman, El Segundo, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 16/100,631

(22) Filed: Aug. 10, 2018

(51) Int. Cl.
*G01B 9/02* (2006.01)
*G01B 11/27* (2006.01)
*G02B 5/18* (2006.01)

(52) U.S. Cl.
CPC ........ *G01B 11/272* (2013.01); *G01B 9/02098* (2013.01); *G02B 5/1814* (2013.01); *G01B 2290/30* (2013.01)

(58) Field of Classification Search
CPC .............. G01B 11/272; G01B 9/02098; G01B 9/02015; G01B 9/02049; G01B 9/02058; G01B 9/02061; G01B 9/02068
See application file for complete search history.

(56) References Cited

U.S. PATENT DOCUMENTS

| 3,829,219 | A | | 8/1974 | Wyant | |
|---|---|---|---|---|---|
| 4,413,909 | A | | 11/1983 | Pohle | |
| 5,355,218 | A | * | 10/1994 | Matsuda | G01M 11/0271 356/520 |
| 6,924,899 | B2 | | 8/2005 | Hutchin et al. | |
| 9,297,880 | B2 | * | 3/2016 | Hutchin | G01S 3/7867 |
| 2003/0222196 | A1 | | 12/2003 | Hutchin et al. | |
| 2006/0061771 | A1 | * | 3/2006 | Hill | G03F 7/70516 356/510 |

FOREIGN PATENT DOCUMENTS

| EP | 2207063 A1 | 7/2010 |
|---|---|---|
| EP | 2453202 A1 | 5/2012 |
| WO | 2006097330 A1 | 9/2006 |

OTHER PUBLICATIONS

Anonymous: "Shearing interferometer—Wikipedia", Feb. 3, 2018 (Feb. 3, 2018), XP055618635, Retrieved from the Internet: URL:https://en.wikipedia.org/w/index.php?title=Shearing interferometer&oldid=823741926 [retrieved on Sep. 4, 2019] p. 1-p. 3; figure 1.

\* cited by examiner

*Primary Examiner* — Jonathan M Hansen
(74) *Attorney, Agent, or Firm* — Lando & Anastasi, LLP (57) ABSTRACT

Auto-alignment beam tracking apparatus and methods. In one example, an auto-alignment beam tracking system includes an optical train that receives an auto-alignment beam, a linear detector array including a plurality of photosensitive detectors each configured to measure intensity of electromagnetic radiation incident thereon, and a lateral shearing interferometer positioned between the optical train and the linear detector array. The optical train is configured to direct the auto-alignment beam to the lateral shearing interferometer. The lateral shearing interferometer is configured to produce an interference pattern at the linear detector array from the auto-alignment beam, wherein changes in the intensity measured by the plurality of photosensitive detectors over time corresponding to a lateral shift of the interference pattern on the linear detector array indicate an angular tilt of the auto-alignment beam.

20 Claims, 10 Drawing Sheets

LATERAL SHEARING INTERFEROMETER FOR AUTO ALIGNMENT BEAM SENSING

BACKGROUND

Auto-alignment systems are used with active and passive electro-optic sensors to maintain pointing in a selected direction and to stabilize the line-of-sight of the sensors. The auto-alignment system typically includes a laser source that generates the auto-alignment beam and a sensor for detecting the auto-alignment beam. Auto-alignment systems can require high speed beam sensing to measure and correct for system misalignment. High resolution typically comes with poor measurement range or requires large pixelated arrays to perform the auto-alignment beam sensing. Many conventional systems for sensing/tracking the auto-alignment beam rely on locating the centroid of a focused spot. Position sensing detectors (PSDs) measure the location of the centroid in two dimensions. A commonly used type of PSD is a so-called "quad cell" that is a 2×2 array of four high-speed photodiodes. For PSDs, there is generally a trade-off between angular resolution and range, and a disadvantage of a quad cell PSD is usually small range of measurement. The quad cell is optimal for maintaining the focus spot at one location. Larger measurement ranges can be achieved using a segmented PSD, which is essentially an array of quad cells. With this type of PSD, increased range comes with larger overall detector size and higher cost. Alternatively, larger measurement ranges can be achieved using a lateral effect PSD, which gives a linear voltage output that corresponds to the location of the focused spot on the diode. Lateral effect PSDs are common for visible and shortwave infrared (SWIR) applications, but do not exist for longwave infrared (LWIR).

SUMMARY OF INVENTION

Aspects and embodiments are directed to an auto-alignment system incorporating a lateral shearing interferometer to provide high speed beam sensing to measure and correct for system misalignment.

According to one embodiment an auto-alignment beam tracking apparatus comprises an optical train configured to receive at least a first portion of an auto-alignment beam, a linear detector array including a plurality of photosensitive detectors each configured to measure intensity of electromagnetic radiation incident thereon, and a lateral shearing interferometer positioned between the optical train and the linear detector array, the optical train being configured to direct the first portion of the auto-alignment beam to the lateral shearing interferometer, the lateral shearing interferometer being configured to produce an interference pattern at the linear detector array from the first portion of the auto-alignment beam, wherein changes in the intensity measured by the plurality of photosensitive detectors over time corresponding to a lateral shift of the interference pattern on the linear detector array indicate an angular tilt of the auto-alignment beam.

In one example the plurality of photosensitive detectors includes at least four photosensitive detectors. In some examples the plurality of photosensitive detectors consists of two to four photosensitive detectors. Having more photosensitive detectors may reduce noise and increase accuracy relative to detector arrays with fewer photosensitive detectors.

In another example the auto-alignment beam has a wavelength in the longwave infrared spectral band.

In one example the lateral shearing interferometer includes a dispersive optical element configured to spatially disperse the first portion of the auto-alignment beam into at least two diffraction orders, wherein interference between the at least two diffraction orders produces the interference pattern at the linear detector array. In one example the dispersive optical element is a diffraction grating. In another example the diffraction grating is blazed for a 50/50 dispersion between the 0 diffraction order and the +1 diffraction order. In one example the diffraction grating is further configured to spectrally disperse the first portion of the auto-alignment beam into a plurality of spectral components and to spatially disperse each of the spectral components into the at least two diffraction orders, and the lateral shearing interferometer is configured to produce the interference pattern at the linear detector array for each of the plurality of spectral components. In another example the lateral shearing interferometer further includes a pupil imaging lens positioned between the dispersive optical element and the linear detector array and configured to image the first portion of the auto-alignment beam onto the linear detector array.

In one example the auto-alignment beam tracking apparatus further comprises a cylinder lens optically contacted to the linear detector array. In one example the cylinder lens is made of gallium arsenide.

According to another embodiment an auto-alignment beam tracking apparatus comprises an optical train configured to receive and direct an auto-alignment beam, a beamsplitter configured to split the auto-alignment beam into a first portion and a second portion, a linear detector array including a plurality of photosensitive detectors each configured to measure intensity of electromagnetic radiation incident thereon, a lateral shearing interferometer positioned between the beamsplitter and the linear detector array, the optical train and the beamsplitter being configured to direct the first portion of the auto-alignment beam to the lateral shearing interferometer, the lateral shearing interferometer being configured to produce an interference pattern at the linear detector array from the first portion of the auto-alignment beam, wherein changes in the intensity measured by the plurality of photosensitive detectors over time corresponding to a lateral shift of the interference pattern on the linear detector array indicate an angular tilt of the auto-alignment beam, and a position sensing sensor configured to receive the second portion of the auto-alignment beam from the beamsplitter and to measure a position of the auto-alignment beam.

In one example the auto-alignment beam tracking apparatus further comprises at least one optical element positioned between the beamsplitter and the position detector assembly and configured to direct the second portion of the auto-alignment beam onto the position detector assembly.

In another example the position detector assembly includes azimuth and elevation detectors configured to measure azimuth and elevation pointing angles, respectively, of the auto-alignment beam.

In another example the lateral shearing interferometer includes a dispersive optical element configured to spatially disperse the first portion of the auto-alignment beam into at least two diffraction orders, wherein interference between the at least two diffraction orders produces the interference pattern at the linear detector array. In one example the dispersive optical element is a diffraction grating. In another example the diffraction grating is blazed for a 50/50 dispersion between the 0 diffraction order and the +1 diffraction order. In one example the diffraction grating is further configured to spectrally disperse the first portion of the auto-alignment beam into a plurality of spectral components and to spatially disperse each of the spectral components into the at least two diffraction orders, and the lateral shearing interferometer is configured to produce the interference pattern at the linear detector array for each of the plurality of spectral components. In another example the lateral shearing interferometer further includes a pupil imaging lens positioned between the dispersive optical element and the linear detector array and configured to image the first portion of the auto-alignment beam onto the linear detector array.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to an auto-alignment system incorporating a lateral shearing interferometer to provide high speed beam sensing to measure and correct for system misalignment.

As discussed above, conventional auto-alignment beam-tracking systems based on position-sensing detectors (PSDs) suffer from a trade-off amongst resolution, range, and size and cost considerations. Further, although there are several technologies that work relatively well in the visible (approximately 0.39-0.7 micrometers) or short-wave infrared (SWIR; approximately 1-3 micrometers) spectral bands, there is presently no position sensing device operating in the longwave infrared (LWIR; approximately 8-12 micrometers) that can track an auto-alignment beam over a large range of angles.

Lateral shearing interferometers are high resolution devices, and also have large measurement range. In particular, a lateral shearing interferometer can be configured to measure small beam tilts using wave interference, as discussed further below, and can be sampled quickly using standard photodiodes. In addition, lateral shearing interferometers may be configured to operate in any optical spectral band, including the LWIR spectral band. Thus, according to certain aspects and embodiments, a lateral shearing interferometer can be configured using one or more uncooled imaging sensors to provide the capability to track an auto-alignment beam in the LWIR spectral band over a range of angles.

Figure 1:
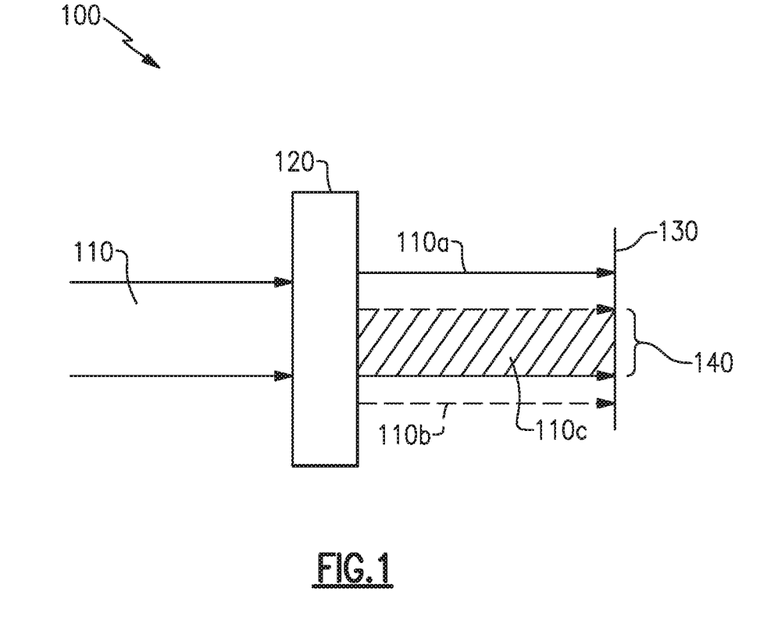
FIG. 1 is a schematic diagram illustrating a principle of operation of a lateral shearing interferometer.

FIG. 1 is a schematic diagram illustrating operation of an example of a lateral shearing interferometer 100. A light beam 110 is directed to a shearing component 120. The shearing component 120 can be implemented in numerous ways, including using spaced-apart partially reflective plates or a diffractive optical element, for example, as discussed in more detail below. The shearing component 120 splits the incident light beam 110 into multiple beams, for example 110a and 110b, as shown in FIG. 1. These beams 110a, 110b are directed to a detector 130. The shearing component 120 is configured such that there is a region of overlap 110c between the multiple beams 110a, 110b. This overlap 110c produces an interference pattern 140 at the detector 130. The interference pattern 140 can be used to derive information about the incident light beam 110. For example, as discussed further below, the interference pattern 140 can be used to measure tilt or angle of an auto-alignment beam.

Figure 2A:
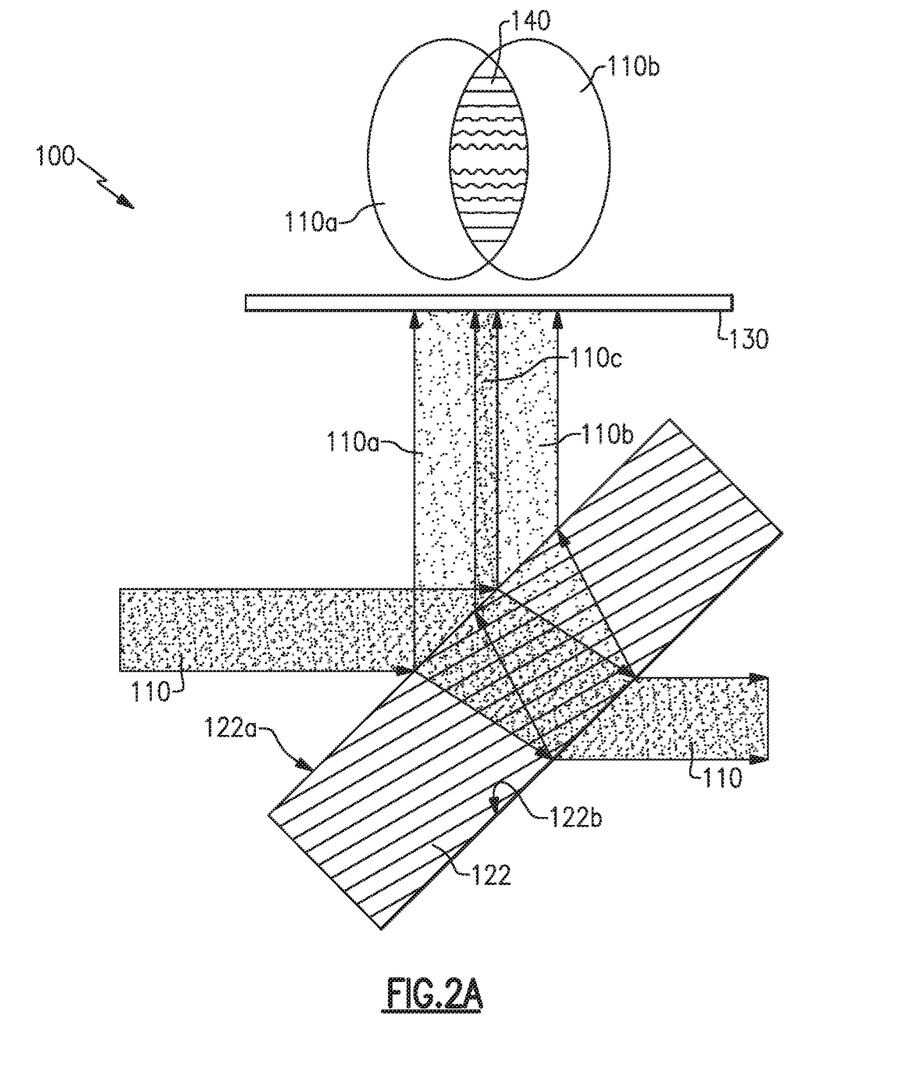
FIG. 2A is a schematic diagram of one example of a lateral shearing interferometer.

The operation of examples of lateral shearing interferometers is further illustrated with reference to FIGS. 2A and 2B. FIG. 2A illustrates an example in which the shearing component 120 is a shearing plate 122 having two flat optical surfaces 122a and 122b that are spaced apart from another by the thickness of the plate. In some examples the two optical surfaces 122a and 122b are parallel to one another, and in other examples the two optical surfaces 122a and 122b are disposed at a slight angle relative to one another (referred to as a wedge angle). The shearing plate 122 can be made of a high-quality optical glass, for example. The incident light beam 110 is reflected twice by the shearing component 120, as shown in FIG. 2A and the two reflections 110a, 110b are laterally separated due to the finite thickness of the plate 122 and by the wedge angle. This separation is referred to as the shear. The reflections are incident on the detector 130, and the overlap 110c produces the interference pattern 140 at the detector 130, as discussed above.

Figure 2B:
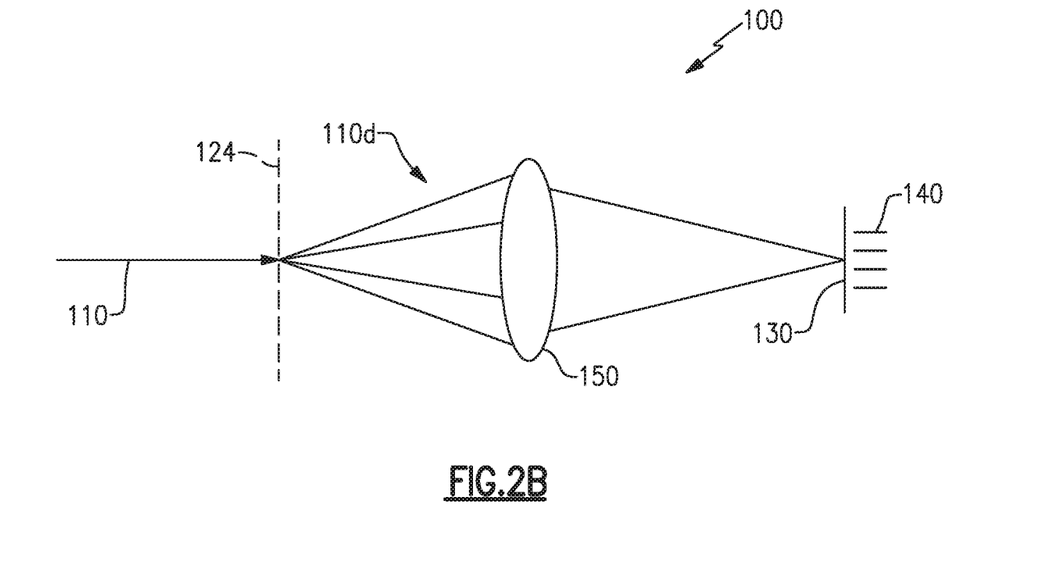
FIG. 2B is a schematic diagram of another example of a lateral shearing interferometer.

FIG. 2B schematically illustrates another example in which the shearing component 120 is implemented as a diffraction grating 124 or dispersive optical element. The diffraction grating 124 disperses the incident light beam 110, producing diffracted light 110d. The diffracted light 110d directed onto the imaging detector 130 using an imaging lens 150 and the grating 124 is thus imaged onto the imaging detector 130. In particular, depending on the construction of the diffraction grating 124, the incident light beam 110 is spatially dispersed into multiple diffraction orders. Spatial separation of the incident light beam 110 into the different diffraction orders corresponds to the shear, and overlap between the multiple diffraction orders causes the interference pattern 140 to be generated at the detector 130, similarly to as discussed above. As shown in FIG. 2B, the interference pattern 140 can comprise multiple dark and light "fringes" that can be detected and imaged at the detector 130.

Figure 3A:
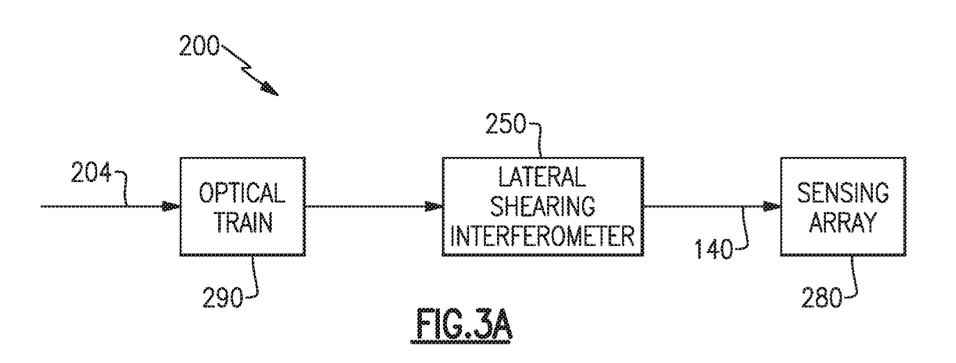
FIG. 3A is a block diagram of one example of an optical system including a shearing interferometer for auto-alignment beam sensing according to aspects of the present invention.
Figure 3B:
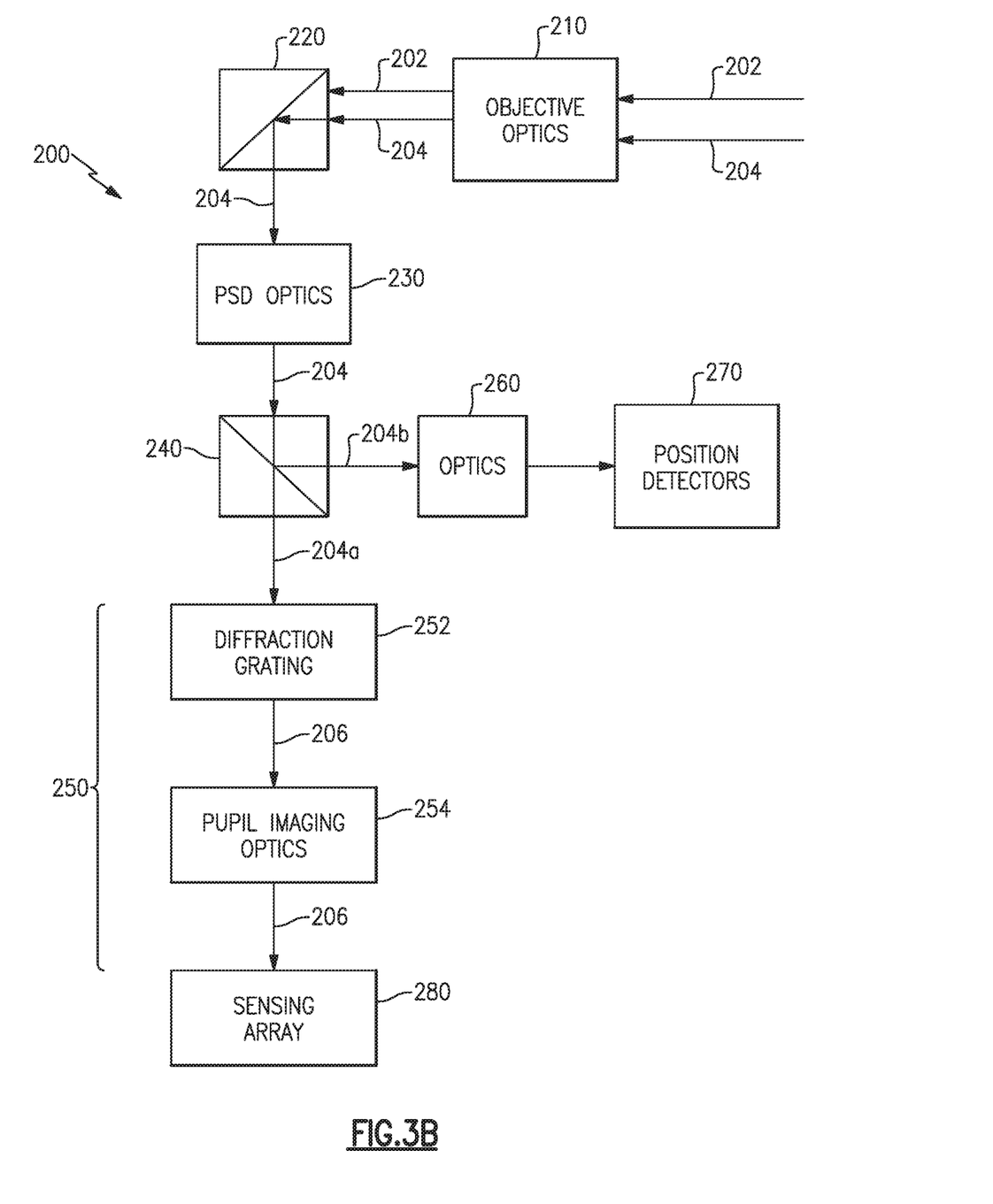
FIG. 3B is a more detailed block diagram of one example of the optical system of FIG. 3A according to aspects of the present invention.

Referring to FIGS. 3A and 3B there is illustrated a block diagram of an example of an optical system 200 incorporating an auto-alignment beam tracking apparatus according to certain embodiments. As discussed in more detail below, the optical system 200 includes an optical train 290 made up of one or more optical elements, such as mirrors, lenses, beamsplitters, etc., that receives electromagnetic radiation, including at least a portion of an auto-alignment beam 204. The optical system 200 further includes a sensing array 280, which in one example is a linear detector array including a plurality of photosensitive detectors each configured to measure intensity of electromagnetic radiation incident thereon, and a lateral shearing interferometer 250 positioned between the optical train 290 and the sensing array 280. The optical train 290 is configured to direct at least the portion of the auto-alignment beam 204 to the lateral shearing interferometer 250. The lateral shearing interferometer 250 is configured to produce an interference pattern at the sensing array 280 from the portion of the auto-alignment beam 204. As discussed above, changes in the intensity measured by the plurality of photosensitive detectors over time correspond to a lateral shift of the interference pattern on the sensing array 280 and indicate an angular tilt of the auto-alignment beam.

In the example shown in FIG. 3B, optical radiation 202 (i.e., electromagnetic radiation in one or more optical wavebands, such as the visible and infrared spectral bands) from a viewed scene is received by objective optics 210. The objective optics 210 can include one or more lenses and/or one or more mirrors depending on the design of the optical system 200. An auto-alignment beam 204 is also received by the objective optics 210. The auto-alignment beam 204 may be a laser beam produced by a laser source (not shown in FIGS. 3A-B). In one example the auto alignment beam 204 has a wavelength in the longwave infrared (LWIR) spectral band. An auto-alignment beamsplitter 220 separates the auto-alignment beam 204 from the optical radiation 202, which may be directed to other system optics not shown in FIG. 3B. The auto-alignment beam 204 is directed from the auto-alignment beamsplitter 220 to position-sensing optics 230. The position-sensing optics 230 may include one or more lenses and/or mirrors depending on the design of the optical system 200. A beamsplitter 240 splits the auto-alignment beam 204 into two portions; a first portion 204a that is directed to a lateral shearing interferometer 250, and a second portion 204b used for position sensing as discussed further below.

The lateral shearing interferometer 250 is configured to measure beam tilt of the first portion 204a of the auto-alignment beam 204 and thereby track the auto-alignment beam 204 over a range of angles. In the example of FIG. 3B, the first portion 204a of the auto-alignment beam 204 is provided to a diffractive optical element 252 that disperses the beam into its spectral components (i.e., constituent wavelengths). In one example the diffractive optical element 252 is a diffraction grating. The diffraction grating can be reflective or transmissive. In the example shown in FIG. 3B, the diffractive optical element 252 is transmissive, but as will be appreciated by those skilled in the art, may be replaced with a reflective element and the pupil imaging optics 254 and sensing array 280 repositioned accordingly. As discussed above, the diffractive optical element 252 also spatially disperses the first portion 204a of the auto-alignment beam 204 into at least two diffraction orders.

A transmissive diffraction grating includes a set of slits of spacing d, which must be wider than the wavelength of interest to cause diffraction. When the first portion 204a of the auto-alignment beam 204 is incident on the diffraction grating, each slit in the grating acts as a quasi point-source from which light propagates. After the first portion 204a of the auto-alignment beam 204 interacts with the diffraction grating, the diffractive light 206 is composed of the sum of interfering wave components emanating from each slit in the grating. The phase of the diffracted orders varies depending on the given point at which the incident light passes through the grating. At points where the path difference from adjacent slits is equal to half a wavelength, the waves are out of phase and cancel each other to form points of minimum intensity. Similarly, at points where the path difference is equal to a wavelength, the waves are in phase and add to create points of maximum intensity. Thus, the interaction of the first portion 204a of the auto-alignment beam 204 with the diffraction grating creates an interference pattern that can be detected at a sensing array 280.

The beam incident on a diffraction grating, in this case the first portion 204a of the auto-alignment beam 204, can be dispersed into multiple propagation modes (also referred to as diffraction orders of the grating) depending on the construction of the diffraction grating. The diffraction grating has a "zero-order mode" in which there is no diffraction, and one or more higher order modes. The diffracted beams corresponding to consecutive orders may overlap, depending on the spectral content of the incident beam and the grating density (i.e., spacing between slits). The higher the diffraction order, the greater the overlap into the next order. By controlling the cross-sectional profile of the slits (e.g., grooves or other structure used to form the grating), most of the diffracted energy can be concentrated into a particular mode for a given wavelength. This technique is called blazing. In one example in which the diffractive optical element 252 is a diffraction grating, the grating is blazed for a 50/50 split between the zero order mode (m=0) and the positive first order mode (m=+1). Interference between the diffraction orders produces the interference pattern at the sensing array 280.

A variety of different diffraction gratings or other diffractive optical components can be used to implement the diffractive optical element 252. In one example the diffractive optical element 252 is implemented using a "polkadot" beamsplitter available from Thorlabs™ of Newton, N.J. The polkadot beamsplitter includes a vacuum-deposited metal coating on a substrate. The substrate material can be ultraviolet fused silica, glass, calcium fluoride (CaF2) or zinc selenide (ZnSe). The metal coating is applied in a regularly repeating array, which lends the beamsplitter its "polka dot" appearance, and allows it to act as a diffraction grating.

Figure 4:
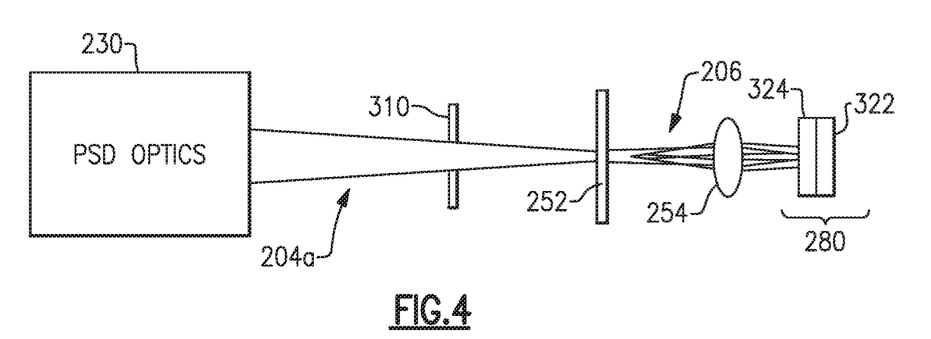
FIG. 4 is a block diagram of a portion of one example of the optical system of FIGS. 3A and 3B showing the interference path according to aspects of the present invention.

As shown in FIG. 3B, the diffracted light 206 is directed via pupil imaging optics 254 onto the sensing array 280. The sensing array 280 includes one or more rows of photo-sensitive pixels configured to detect the interference pattern produced from the diffracted light 206. FIG. 4 is a block diagram showing an example of the interferometer arm of the optical system 200 of FIGS. 3A and 3B. As shown in FIG. 4, at least the first portion 204a of the auto-alignment beam 204 is directed via an aperture 310 to the diffractive optical element 254. The aperture 310 is located at the exit pupil of the position-sensing optics 230. As discussed above, the diffracted light 206 is directed to pupil imaging optics 254. In the example shown in FIG. 4, the pupil imaging optics 254 correspond to a pupil imaging lens; however, in other examples the pupil imaging optics may include one or more lenses and/or mirrors. The pupil imaging optics 254 directs the diffracted light toward the sensing array 280. In one example, the sensing array 280 includes a photo-sensitive linear detector array 322 that comprises two or more photo-sensitive pixels configured to detect the interference pattern produced from the diffracted light 206. In the example shown in FIG. 4, the sensing array 280 also includes a focusing optic 324. In one example the focusing optic 324 is a cylinder lens that is contacted to the linear detector array 322. The cylinder lens may be made of gallium-arsenide (GaAs), for example.

Figure 5:
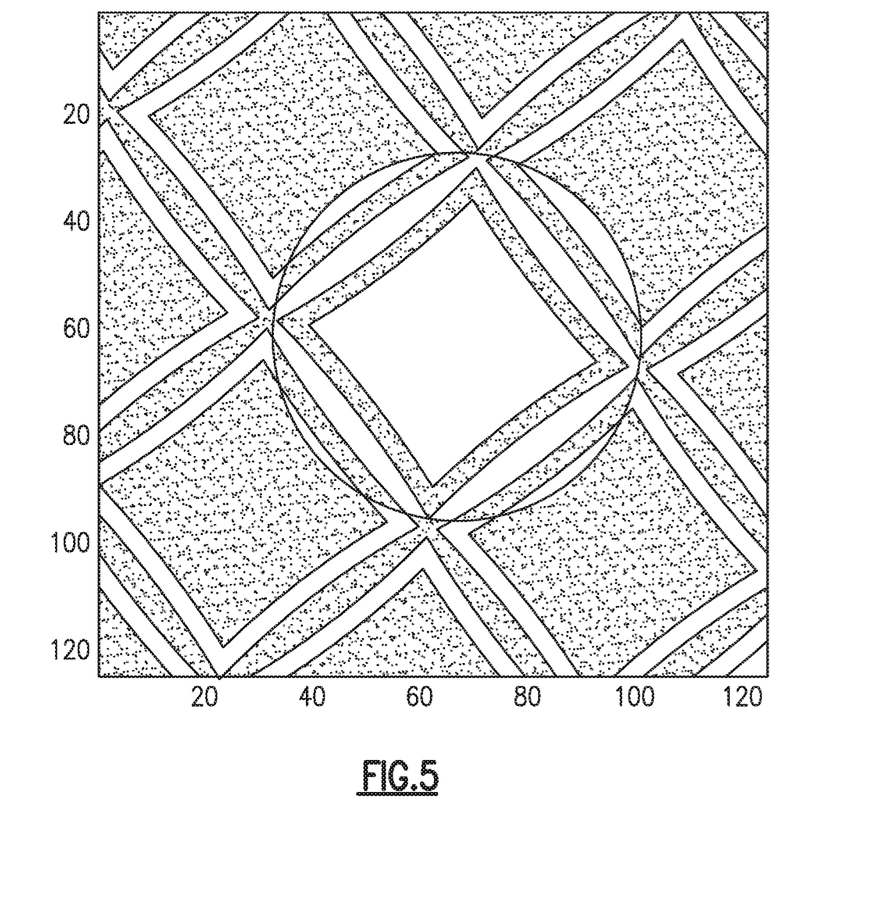
FIG. 5 is a drawing showing an example of an interference pattern according to aspects of the present invention.
Figure 6A:
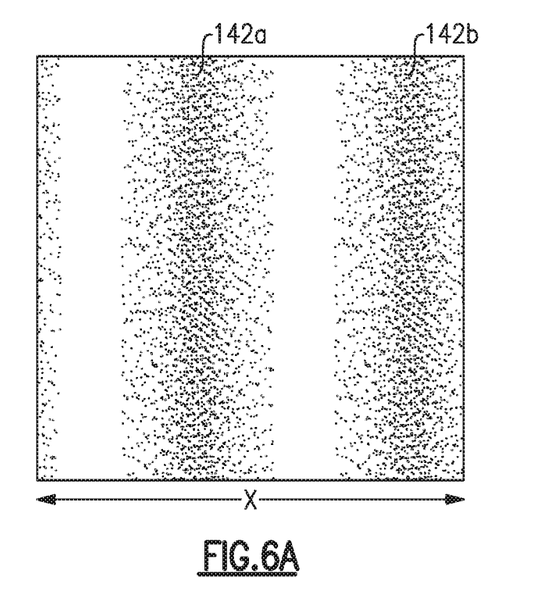
FIGS. 6A and 6B are drawings showing examples of the interference pattern on the same location on a linear detector at different points in time, showing a lateral shift of the interference pattern corresponding to a shift or tilt in the auto-alignment beam, according to aspects of the present invention.
Figure 6B:
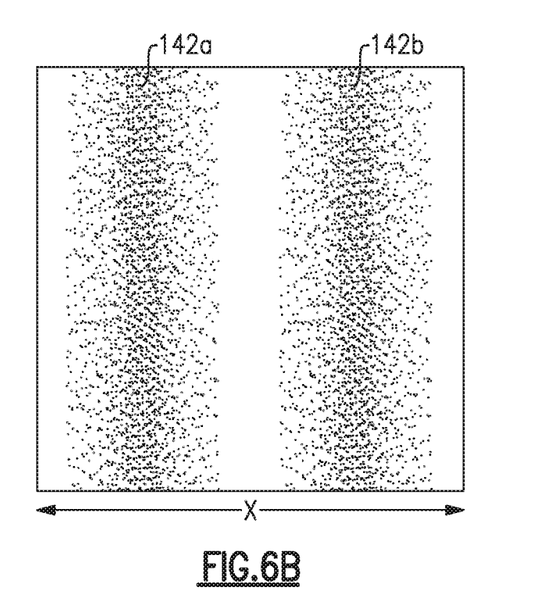

FIG. 5 is an illustration of an example of the interference pattern 140 that may be formed at the sensing array 280 from the diffracted light 206. As the auto-alignment beam 204 shifts or tilts, the interference pattern 140 formed at the sensing array 280 will shift laterally (e.g., left or right) across the linear detector array 322. Thus, different pixels in the linear detector array 322 may measure different intensities of light depending on the lateral position of the interference pattern 140 on the array 280. FIGS. 6A and 6B illustrate an example of the interference pattern 140 on the same location on the linear detector 322 at different points in time, showing a lateral shift of the interference pattern 140 corresponding to a shift or tilt in the auto-alignment beam 204. As can be seen by comparing FIGS. 6A and 6B, the dark regions 142a and 142b of the interference pattern 140 are shifted further to the right along the horizontal x axis in FIG. 6A than in FIG. 6B. In other words, the interference pattern is laterally shifted along the x axis between the time point represented in FIG. 6A and the time point represented in FIG. 6B. Thus, by measuring this lateral shift in the fringes of the interference pattern 140, the tilt of the auto-alignment beam 204 can be tracked over a range of angles. In addition, because the diffractive optical element 252 disperses the first portion 204a of the auto-alignment beam 204 into its constituent wavelengths, interference patterns 140 can be produced for multiple wavelengths (also referred to as spectral components). Accordingly, the lateral shift of the interference fringes can be measured at different wavelengths, providing the ability to simultaneously track the movement of the auto-alignment beam 204 at different wavelengths.

As discussed above, the linear detector array 322 includes two or more pixels arranged side-by-side in a row. Each pixel includes a photodiode that can be rapidly sampled to measure the intensity of the received light. These intensity measurements can be converted into phase measurements, which provide an indication of the tilt in the auto-alignment beam 204. Because the phase measurements are modulo $2\pi$, the range of measurement of the tilt of the auto-alignment beam 204 is large without requiring a large array of detectors. For example, a digital counter can be coupled to the sensing array 280 to count the number of times the phase measurement crosses $2\pi$, thereby providing a scalable measurement of the angular range of tilt of the auto-alignment beam 204 without needing to increase the number of pixels in the array 280. The lateral shearing interferometer 250 and the linear detector array 322 can be configured such that the interference pattern 140 spans a selected number of detector pixels, such as 2, 3, 4, 5, 6, or more pixels.

The table below provides equations that can be used to convert intensity measurements at the pixels of the linear detector array 322 into phase measurements ($\Phi$). The number of detectors corresponds to the number of pixels in the linear detector array 322 over which the interference pattern 140 is formed.

TABLE 1

| Algorithm | No. of Detectors | Phase Shift |
|---|---|---|
| $\Phi = \mathrm{atan}\left(\frac{-I_2}{I_1}\right)$ | 2 | $\pi/2$ |
| $\Phi = \mathrm{atan}\left(\frac{I_3 - I_2}{I_1 - I_2}\right)$ | 3 | $\pi/2$ |
| $\Phi = \mathrm{atan}\left(\sqrt{3}\,\frac{I_3 - I_2}{2I_1 - I_2 - I_3}\right)$ | 3 | $2\pi/3$ |
| $\Phi = \mathrm{atan}\left(\frac{I_4 - I_2}{I_1 - I_3}\right)$ | 4 | $\pi/2$ |
| $\Phi = \mathrm{atan}\left(2\,\frac{I_4 - I_2}{I_1 - 2I_3 - I_5}\right)$ | 5 | $\pi/2$ |
| $\Phi = \mathrm{atan}\left(4\,\frac{4I_4 - 3I_2 - I_6}{I_1 - 4I_3 - 3I_5}\right)$ | 6 | $\pi/2$ |

Figure 7A:
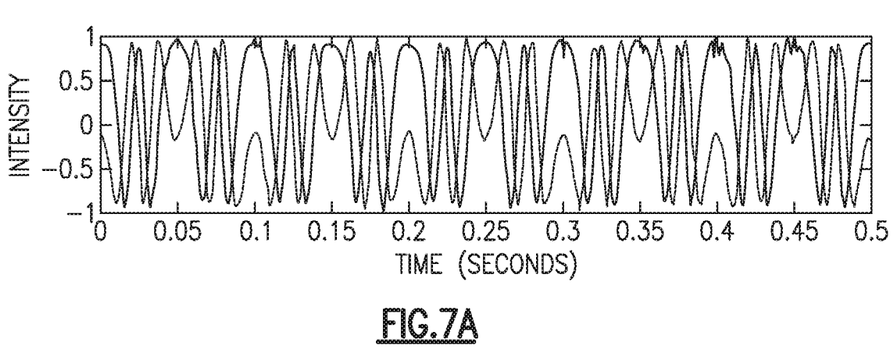
FIGS. 7A-D are graphs showing measured experimental results for an example of an auto-alignment beam tracking system using a lateral shearing interferometer according to aspects of the present invention.
Figure 7B:
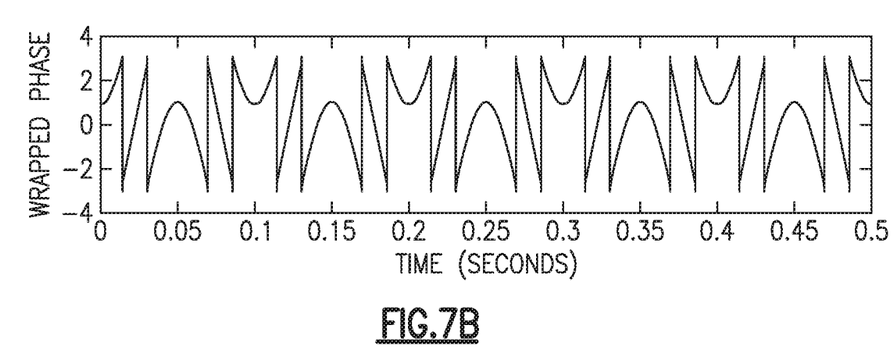
Figure 7C:
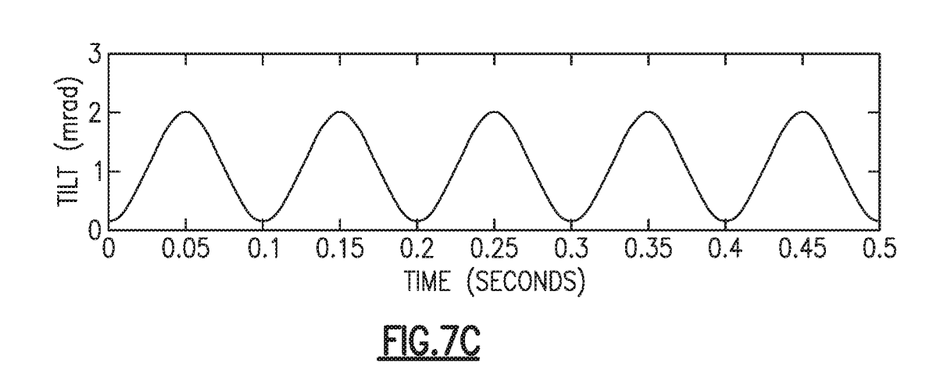
Figure 7D:
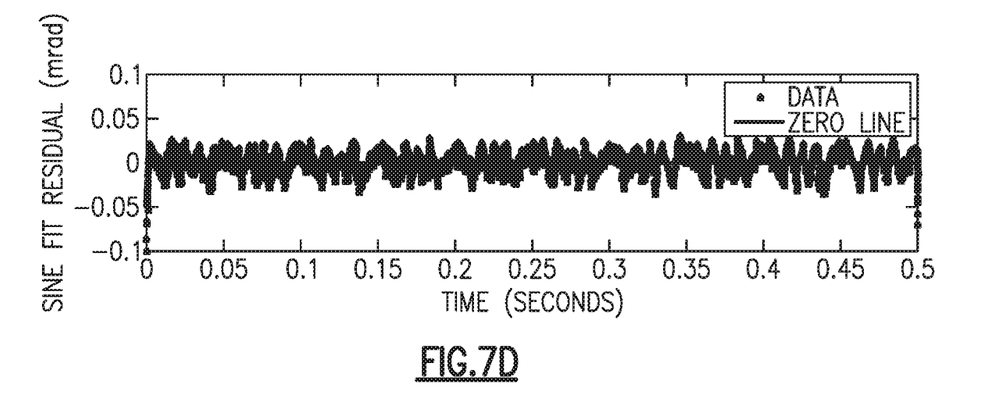

Experiments were performed to collect measurements using a linear detector array configured such that the interference pattern extended over two pixels. For these measurements, the light source was a laser that was temporally modulated with a sine wave because the detector was AC coupled, and irradiance was computed from the magnitude of the modulated sine wave. However, in certain implementation examples the laser (or other source of the auto-alignment beam 204) may be continuous and the detector 322 directly read the irradiance. FIGS. 7A-D are graphs of the measured experimental results. FIG. 7A is a graph of the collected irradiance, also referred to as intensity data, (vertical axis) over time (horizontal axis). FIG. 7B is a graph showing the intensity data converted into phase measurements (vertical axis) over the same time frame (horizontal axis). FIG. 7C is a graph showing the corresponding measured tilt (derived from the phase measurements) over time. Removal of the sine wave from the measured tilt provides the residual angular tilt in milliradians over time (FIG. 7D). For this example, which as noted above, used a linear detector array having only two pixels, the measured angular tilt had 12 microradians ($\mu$rad) RMS of error. This is equivalent to measuring the centroid of a focused spot (the conventional method for auto-alignment beam tracking) to better than $1/100^{th}$ of the Airy Disk diameter. Systems using detector arrays with more pixels would be less sensitive to noise and even more accurate. For example, a four-pixel detector may allow for tracking to about $1/300^{th}$ of the Airy Disk diameter (or point spread function). Conventional spot tracking systems require a trade-off between measurement range and resolution. For example, some systems can achieve very high accuracy, but have very limited measurement range. In contrast, aspects and embodiments of the lateral shearing interferometer-based systems disclosed herein can provide auto-alignment beam tracking over a large range of angles while also providing excellent tracking resolution/accuracy.

Thus, by using a diffractive optical element and a linear detector array, along with imaging optics, to form a lateral shearing interferometer 250 configured to measure the angular beam tilt, a simple and highly accurate auto-alignment beam tracking apparatus can be provided.

Referring again to FIG. 3B, the second portion 204b of the auto-alignment beam 204 is directed via optics 260 to a position detector assembly 270. In one example the position detector assembly 270 includes azimuth and elevation detectors configured to measure azimuth and elevation pointing angles of the auto-alignment beam 204. The optics 260 can include one or more lenses and/or mirrors to condition and image the first portion 204a of the auto-alignment beam 204 onto the position detector assembly 270, which can measure a location of the auto-alignment beam 204. Thus, this second portion 204b of the auto alignment beam, which is not used for the interference measurements, can be used to provide an absolute location of the auto-alignment beam 204. This can be beneficial because the interferometer is a fringe-counting system, and measurements are therefore relative to a given starting location.

Thus, aspects and embodiments may provide a robust, accurate, and highly scalable auto-alignment beam tracking system that can be implemented using a small number of detectors (i.e., a linear detector array 322 with only a few pixels). Detectors of state-of-art technology have sample rates that are suitable for performing auto-alignment beam tracking in the LWIR spectral band, a feature not available in conventional auto-alignment beam tracking systems, and further, embodiments of the system disclosed herein can advantageously perform beam tracking in multiple spectral bands, as discussed above. In addition, embodiments of the auto-alignment beam tracking system have better measurement sensitivity than a conventional spot tracking system because the measurements are based on beam interference. Moreover, because the phase measurements are modulo $2\pi$, the range of measurement is large without requiring a large array of detectors, and the system provides a scalable measurement range without needing to increase the number of detectors.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. The methods and apparatuses discussed herein are not limited in application to the details of construction and the arrangement of components set forth in the foregoing description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Accordingly, the foregoing description and drawings are by way of example only, and the scope of the invention should be determined from proper construction of the appended claims, and their equivalents.

What is claimed is:

1. An auto-alignment beam tracking apparatus comprising:
    objective optics configured to receive optical radiation from a viewed scene and an auto-alignment beam;
    an auto-alignment beamsplitter configured to separate the auto-alignment beam from the optical radiation;
    an optical train configured to receive at least a first portion of the auto-alignment beam from the auto-alignment beamsplitter;
    a linear detector array including a plurality of photosensitive detectors arranged side-by-side in a single row, each photosensitive detector being configured to measure intensity of electromagnetic radiation incident thereon; and
    a lateral shearing interferometer positioned between the optical train and the linear detector array, the optical train being configured to direct the first portion of the auto-alignment beam to the lateral shearing interferometer, the lateral shearing interferometer being configured to produce an interference pattern at the linear detector array from the first portion of the auto-alignment beam, wherein changes in the intensity measured by the plurality of photosensitive detectors over time corresponding to a lateral shift of the interference pattern on the linear detector array indicate an angular tilt of the auto-alignment beam,
    wherein the lateral shearing interferometer includes a diffraction grating configured to spatially disperse the first portion of the auto-alignment beam into at least two diffraction orders, interference between the at least two diffraction orders producing the interference pattern at the linear detector array, and wherein the diffraction grating is blazed for a 50/50 dispersion between the 0 diffraction order and the +1 diffraction order.

2. The auto-alignment beam tracking apparatus of claim 1 wherein the plurality of photosensitive detectors includes at least four photosensitive detectors.

3. The auto-alignment beam tracking apparatus of claim 1 wherein the auto-alignment beam has a wavelength in the longwave infrared spectral band.

4. The auto-alignment beam tracking apparatus of claim 1 wherein the diffraction grating is further configured to spectrally disperse the first portion of the auto-alignment beam into a plurality of spectral components and to spatially disperse each of the spectral components into the at least two diffraction orders; and
    wherein the lateral shearing interferometer is configured to produce the interference pattern at the linear detector array for each of the plurality of spectral components.

5. The auto-alignment beam tracking apparatus of claim 1 wherein the lateral shearing interferometer further includes a pupil imaging lens positioned between the diffraction grating and the linear detector array and configured to image the first portion of the auto-alignment beam onto the linear detector array.

6. The auto-alignment beam tracking apparatus of claim 1 further comprising a cylinder lens optically contacted to the linear detector array.

7. The auto-alignment beam tracking apparatus of claim 6 wherein the cylinder lens is made of gallium arsenide.

8. An auto-alignment beam tracking apparatus comprising:
- an optical train configured to receive and direct an auto-alignment beam;
- a beamsplitter configured to split the auto-alignment beam into a first portion used for interference measurements and a second portion not used for the interference measurements;
- a linear detector array including a plurality of photosensitive detectors arranged side-by-side in a single row, each photosensitive detector configured to measure intensity of electromagnetic radiation incident thereon;
- a lateral shearing interferometer positioned between the beamsplitter and the linear detector array, the optical train and the beamsplitter being configured to direct the first portion of the auto-alignment beam to the lateral shearing interferometer, the lateral shearing interferometer being configured to produce an interference pattern at the linear detector array from the first portion of the auto-alignment beam, wherein changes in the intensity measured by the plurality of photosensitive detectors over time corresponding to a lateral shift of the interference pattern on the linear detector array indicate an angular tilt of the auto-alignment beam; and
- a position sensing detector assembly configured to receive the second portion of the auto-alignment beam from the beamsplitter, the position sensing detector assembly including azimuth and elevation detectors configured to measure azimuth and elevation pointing angles, respectively, of the auto-alignment beam to determine an absolute location of the auto-alignment beam.

9. The auto-alignment beam tracking apparatus of claim 8 further comprising at least one optical element positioned between the beamsplitter and the position sensing detector assembly and configured to direct the second portion of the auto-alignment beam onto the position sensing detector assembly.

10. The auto-alignment beam tracking apparatus of claim 8 wherein the lateral shearing interferometer includes a dispersive optical element configured to spatially disperse the first portion of the auto-alignment beam into at least two diffraction orders, wherein interference between the at least two diffraction orders produces the interference pattern at the linear detector array.

11. The auto-alignment beam tracking apparatus of claim 10 wherein the dispersive optical element is a diffraction grating.

12. The auto-alignment beam tracking apparatus of claim 11 wherein the diffraction grating is blazed for a 50/50 dispersion between the 0 diffraction order and the +1 diffraction order.

13. The auto-alignment beam tracking apparatus of claim 11 wherein the diffraction grating is further configured to spectrally disperse the first portion of the auto-alignment beam into a plurality of spectral components and to spatially disperse each of the spectral components into the at least two diffraction orders; and
- wherein the lateral shearing interferometer is configured to produce the interference pattern at the linear detector array for each of the plurality of spectral components.

14. The auto-alignment beam tracking apparatus of claim 10 wherein the lateral shearing interferometer further includes a pupil imaging lens positioned between the dispersive optical element and the linear detector array and configured to image the first portion of the auto-alignment beam onto the linear detector array.

15. The auto-alignment beam tracking apparatus of claim 8 further comprising:
- objective optics configured to receive the auto-alignment beam and optical radiation from a viewed scene; and
- an auto-alignment beamsplitter configured to separate the auto-alignment beam from the optical radiation and to direct the auto-alignment beam to the optical train.

16. The auto-alignment beam tracking apparatus of claim 8 wherein the plurality of photosensitive detectors includes at least four photosensitive detectors.

17. The auto-alignment beam tracking apparatus of claim 8 wherein the plurality of photosensitive detectors consists of two photosensitive detectors.

18. The auto-alignment beam tracking apparatus of claim 8 wherein the auto-alignment beam has a wavelength in the longwave infrared spectral band.

19. The auto-alignment beam tracking apparatus of claim 8 further comprising a gallium arsenide cylinder lens optically contacted to the linear detector array.

20. The auto-alignment beam tracking apparatus of claim 1 wherein the plurality of photosensitive detectors consists of two photosensitive detectors.

* * * * *